Oct. 21, 1952     L. F. STREET     2,614,290
PELLET-CUTTING MECHANISM
Filed Feb. 8, 1950     2 SHEETS—SHEET 1
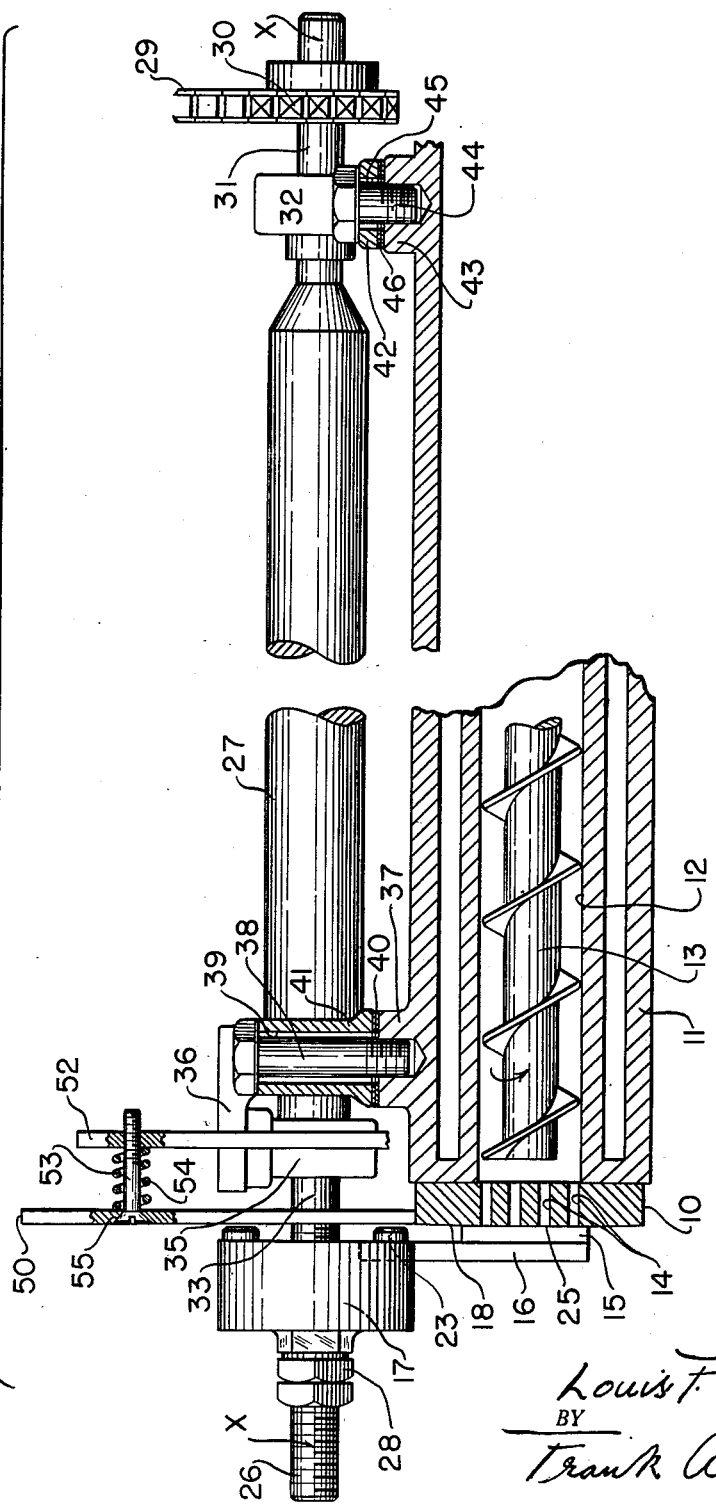
INVENTOR.
Louis F. Street
BY
Frank A. Bower
ATTORNEY Oct. 21, 1952      L. F. STREET      2,614,290
PELLET-CUTTING MECHANISM
Filed Feb. 8, 1950      2 SHEETS—SHEET 2
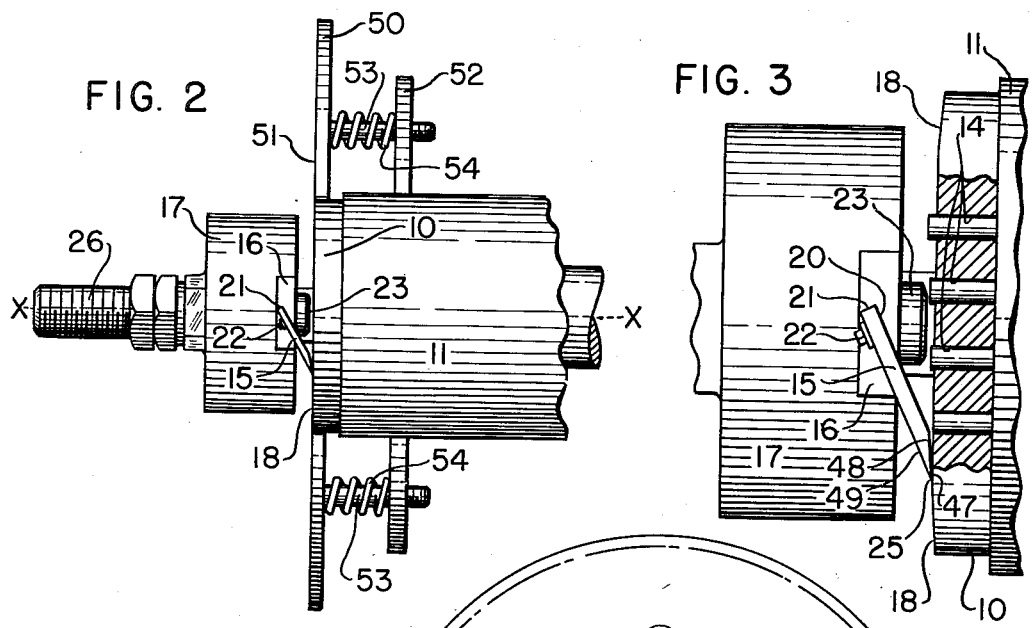
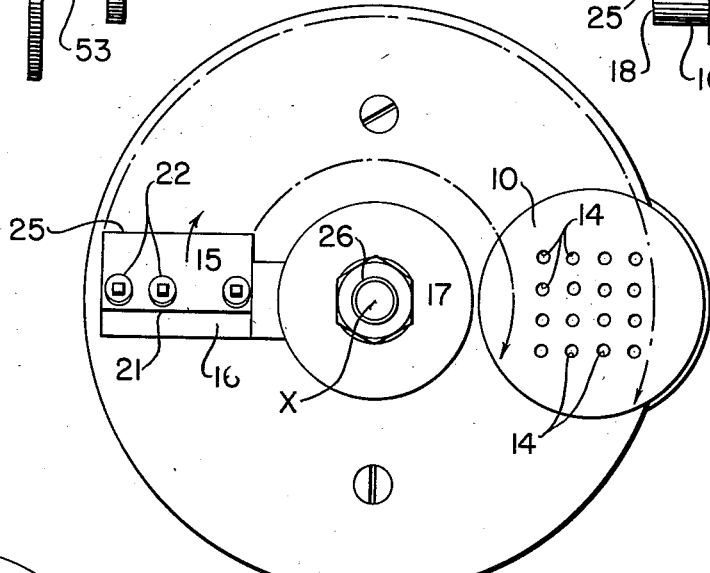
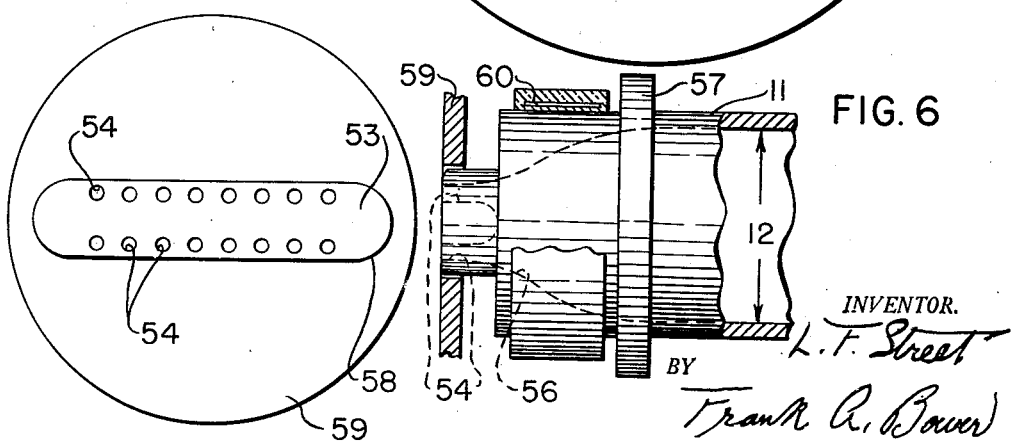
INVENTOR.
L. F. Street
BY Frank A. Bower
ATTORNEY Patented Oct. 21, 1952

2,614,290

UNITED STATES PATENT OFFICE 2,614,290

PELLET-CUTTING MECHANISM

Louis F. Street, Philadelphia County, Pa., assignor to Welding Engineers, Inc., Norristown, Pa., a corporation of Delaware Application February 8, 1950, Serial No. 142,955

6 Claims. (Cl. 18—12)

This invention relates to pellet-forming mechanism and particularly to the extrusion of continuous strands of plastic material and the cutting of said strands into desired pellet form as they are extruded.

The object of the invention is to provide a simple, effective cutting mechanism adapted to operate at the discharge of the extrusion apparatus to sharply separate the emerging plastic strands into substantially identical pellets of predetermined length.

Further objects of the invention, particularly in the relation between the cutter and the group of extruded strands during the cutting operation, will appear from the following specification taken in connection with the accompanying drawings in which:

Fig. 1 is a fragmentary plan view of the discharge end of an extrusion machine provided with cutting mechanism of this invention;

Fig. 2 is a side elevation of the mechanism shown in Fig. 1;

Fig. 3 is an enlarged view of a portion of Fig. 2 with the extruding die plate in section;

Fig. 4 is a face view of the knife, die and guard shown in Figs. 1 to 3;

Fig. 5 is a face view of a modified form of extrusion die; and

Fig. 6 is sectional detail of the die shown in Fig. 5.

In the apparatus illustrated in the drawings, an extrusion die 10 is mounted at the end of a jacketed supply cylinder 11 having a bore 12 with fed screw 13 for forcing the material through the orifices 14 of the die.

A knife blade 15 carried by arm 16 of rotary head 17 sweeps across the face 18 of the die 10 and cuts into pellets the strip or strands of material extruded through orifices 14. This extruded material is soft, plastic and, with many compositions, sticky so that the proper cutting of the strips or strands as they emerge requires a carefully applied and controlled severing action to cleanly chop off the extruded ends into pellets of desired uniform size and shape.

As illustrated in Fig. 3, the blade 15 has its cutting edge in contact with the face 18 of the die and is mounted in the right angled seat formed by the surfaces 20, 21 of the arm 16. The rear edge of blade 15 is backed against the ledge surface 21 and the blade is held in place on the surface 20 by bolts 22. Shims may be used between the knife and the seat surfaces to position the knife edge relative to the arm. The arm 16 has its inner end seated in a groove in the rear of the head 17 and fastened in said groove by bolt 23, this arm 16 (Fig. 4) extending substantially radially from the head which turns on axis X.

The arm 16 and blade 15 are light and somewhat resilient and yielding, holding the cutting edge 25 of the knife blade against the die surface, and the precise distribution of the pressure at the cutting edge as it sweeps the surface 18 over the orifices 14 is controlled by a careful adjustment of the axis X relative to the plane of this surface 18 of the extruding die. The head 17 is threaded onto the protruding end 26 of the spindle member 27 and is fixed in adjusted position by lock nuts 28 so that the head 17 rotates with this spindle driven at desired speed by chain 29 and sprocket 30. The rear end 31 of the spindle is journaled in pillow block 32 near the sprocket 30 and the front end 26, 33 of the spindle is journaled in the inverted pillow block 35 carried by bracket member 36 bolted to boss 37 of the extruder casting by bolt 38 in enlarged bolt hole 39 and with shims 40 intervening between the bracket base 41 and the boss 37. The rear pillow block 32 has its base flange 42 bolted to boss 43 of the extruder casting by bolt 44 through enlarged bolt hole 45 and with shims 46 intervening between the base 42 and boss 43. Shims 40, 46 provide for adjustment of the angle of the cutter axis X in its horizontal plane and the enlarged bolt holes 39, 45 provide for adjustment of the angle of the cutter axis X in its vertical plane so that there is a precise universal setting of the plane swept by the rotation of the knife edge.

This may closely parallel the plane of the die face 18 or be at a slight angle thereto so as to ease the contact of the knife edge with the die surface. The initial engagement of the knife edge to the edge of the die face may also be softened by slight relief and rounding of the face edge so that the pressure of the edge on the surface is gradually developed as the blade moves toward the orifices 14. At this line of contact, the under surface of the blade 15 is flat at 47 (Fig. 3) along the die face for a small amount about $\frac{1}{32}''$ and then at 48 eases off at an angle of approximately 5° to avoid interference with the front surface of the next succeeding pellet. The front face 49 of the knife is flat as shown and at an angle of about 25° to the die face 18.

Usually the travel of the knife edge 25 from and to the die will be protected by a guard or shield 50 in generally circular form having its face 51 in a plane set slightly back of the plane of the die face 18 and clear of the knife edge but very close to it. This guard 50 is adjustably supported by plate 52 by means of the screws 53 and springs 54 compressed between the guard and plate. The screws 53 have their heads rotatably seated in conical recesses 55 in the guard and are threaded through the supporting plate 52 welded or otherwise fastened rigidly to the bracket 36.

In Figs. 5 and 6 a modified form of die head 53 is shown having lines of orifices 54 spaced on opposite sides of a radius from axis C or this radius may extend along one of the rows. The orifices 54 on each line may be relatively closely spaced, for instance, one-half of an orifice diameter to one and one-half diameters but the lines must be spaced apart a distance of two or more orifice diameters because of the tendency of the cutting blade to carry with it for some distance the pellets cut from the upper row. The interior of the die 53 will be formed as shown at 56 to guide the plastic along smooth flow lines from the bore 12 to lines of orifices, it being evident that a single line of these orifices could be employed instead of a plurality. The base flange 57 is fastened to the end of the cylinder 11 and the protruding orifice end 58 is set in a corresponding opening in the shield or guard 59, an electric heater 60 preferably of the strap type surrounding the intermediate portion of the die member to control the temperature of the extruding material. The holes of one row may be of a different diameter than those of the other row to give a mixture of different-sized pellets.

This temperature regulation of the consistency of the extruded material is often of critical importance to give the desired pelleting at an efficient rate. The more frequent the cuts the greater will be the output for a given pellet length which in turn is controlled by the rate of extrusion. It is therefore desirable to increase this extrusion rate as much as permitted by the required consistency of the material as it passes from the orifices. The temperature control enables this consistency to be determined and held at the point of maximum discharge while allowing a clean cut to be made by the knife. The rate of the knife stroke is such as to carry the pellet with the blade imparting a velocity and consequent centrifugal force by which the pellets are thrown off and outward away from axis X for a given desired size of pellet, and rate of extrusion. The size and number of die orifices are such as to give the maximum output with the blade speed sufficient to insure a clean severance and discharge.

The pellet-cutting operation occupies only a small part of the total travel of the knife blade and all the orifices 21 are grouped together at a distance from the axis of the cutter arm 41 so that the rate of cutting is not widely different for the near and far orifices. The cutting action is therefore substantially uniform and gives pellets of substantially uniform shape and size with a very precise control of the rate of cutting, since it is only necessary to vary the rate of rotation of the arm 16, for instance, by changing the drive of sprocket 30. A number of cutting arms may be provided but the speed of the cutting operation should correspond to at least a linear velocity of 500 feet per minute for the blade in order to give effect to the inertia of the extruded material in maintaining the cooperation between the blade surfaces and the pellet is given a properly regular shape. Even with relatively sticky material such as polystyrene, polyethylene, fluoroethylene, nylon, cellulosic thermoplastics, ethyl cellulose, the acrylics, the polyvinylidene chlorides and the like speeds above 500 feet per minute will reduce the instant of cutting to a sharp slicing impact, giving a clean cut and freely discharging the pellet without mutilation.

I claim:

1. A pellet-forming mechanism comprising a rotary cutter arm having a predetermined axis of rotation, an extruding die having lines of extruding orifices in a group at one side of said axis and spaced therefrom a distance greater than the greatest radial extent of said group from the innermost to the outermost orifice and occupying not more than 40° of the circular path of the cutter arm, and a cutter blade carried by the end of said arm and having a cutting edge in a substantially radial plane and extending at an acute angle to the radii from said axis so that said edge extends in a generally radial direction through said group of orifices and moves circularly across all of the orifices at a speed of at least 500 feet per minute and at relative linear velocities differing by less than 2 to 1.

2. A pellet-forming mechanism as set forth in claim 1 in which the rotary cutter arm is axially fixed to adjusted position and the cutter blade is resilient and yieldingly pressed against the surface of the extruding die.

3. A pellet-forming mechanism as set forth in claim 1 in which the mounting for the rotary cutter arm is angularly tiltable to adjust the cutter blade edge relative to the die face and the cutter blade is resilient to maintain a yielding pressure of the blade against the surface of the extruding die.

4. A pellet-forming mechanism as set forth in claim 1 in which the cutter blade edge between the front and back faces is formed with under surfaces comprising a narrow surface parallel to the die face and contacting therewith and a following surface at a slight angle thereto.

5. A pellet-forming mechanism as set forth in claim 1 in which the extrusion orifices are in a plurality of rows so that a radial line from the cutter arm shaft axis passes approximately along one row or between the rows, the orifices of each row being relatively closely spaced at a distance not exceeding two orifice diameters and the rows being spaced apart at least two orifice diameters.

6. A pellet-forming mechanism as set forth in claim 5 in which there are orifices of varying sizes so that more than one size pellet is cut at each sweep of the cutting knife edge.

LOUIS F. STREET.

REFERENCES CITED

The following references are of record in the file of this patent:

UNITED STATES PATENTS

| Number | Name | Date |
|---|---|---|
| 1,205,710 | Cavagnaro | Nov. 21, 1916 |
| 1,814,820 | Boswell | July 14, 1931 |
| 1,959,628 | Jacobson | May 22, 1934 |
| 2,178,431 | Orr | Oct. 31, 1939 |
| 2,401,236 | Fielitz | May 28, 1946 |
| 2,432,734 | Doeskin | Dec. 16, 1947 |
| 2,466,587 | Genovese | Apr. 5, 1949 |